US011047496B1

(12) United States Patent
McConnell

(10) Patent No.: US 11,047,496 B1
(45) Date of Patent: Jun. 29, 2021

(54) MONITORING SYSTEM FOR DETECTING LEAKS USING A SYSTEM OF FLOW RATE SENSORS AND SMART VALVES

(71) Applicant: Alarm.com Incorporated, Tysons, VA (US)

(72) Inventor: Ian McConnell, Forest Lake, MN (US)

(73) Assignee: Alarm.com Incorporated, Tysons, VA (US)

(*) Notice: Subject to any disclaimer, the term of this patent is extended or adjusted under 35 U.S.C. 154(b) by 365 days.

(21) Appl. No.: 16/176,974

(22) Filed: Oct. 31, 2018

Related U.S. Application Data

(60) Provisional application No. 62/579,718, filed on Oct. 31, 2017.

(51) Int. Cl.
*F16K 31/02* (2006.01)
*G01M 3/28* (2006.01)
*E03B 7/07* (2006.01)

(52) U.S. Cl.
CPC ........... *F16K 31/02* (2013.01); *G01M 3/2815* (2013.01); *E03B 7/071* (2013.01); *Y10T 137/0452* (2015.04)

(58) Field of Classification Search
USPC .......................................................... 702/51
See application file for complete search history.

(56) References Cited

U.S. PATENT DOCUMENTS

| 6,491,062 B1* | 12/2002 | Croft ..................... F17D 5/06 137/624.11 |
| 7,114,516 B2 | 10/2006 | Ito |
| 7,306,008 B2 | 12/2007 | Tornay |
| 7,900,647 B2 | 3/2011 | Tornay |
| 9,146,172 B2 | 9/2015 | Trescott |
| 10,465,834 B2* | 11/2019 | Barnes ..................... G01M 3/28 |
| 10,526,771 B1* | 1/2020 | Devereaux ............. E03B 7/071 |
| 2006/0137090 A1* | 6/2006 | Jeffries ............... G01M 3/2807 4/664 |
| 2006/0174707 A1* | 8/2006 | Zhang ................ G01N 29/4418 73/592 |
| 2013/0306170 A1* | 11/2013 | Rivera ..................... F16L 55/00 137/551 |
| 2017/0131174 A1 | 5/2017 | Enev et al. |
| 2017/0218607 A1* | 8/2017 | Woods ..................... E03B 7/071 |
| 2017/0298597 A1* | 10/2017 | Hammond ............. G08B 5/222 |

* cited by examiner

*Primary Examiner* — Paul D Lee
(74) *Attorney, Agent, or Firm* — Fish & Richardson P.C.

(57) ABSTRACT

Methods, systems, and apparatus, including computer programs encoded on a storage device, for detecting water leaks and mitigating the damage caused by the detected leaks. The system may include a processor and a storage device storing instructions that, when executed by the processor, cause the processor to perform operations. The operations may include obtaining sensor data that is generated by one or more flow rate sensors located at a property, obtaining status data that is generated by one or more connected water shutoff valves located at the property, determining, based on (i) the obtained sensor data and (ii) the obtained status data whether a water leak has been detected at the property, and in response to determining, based on (i) the obtained sensor data and (ii) the obtained status data, that a water leak has been detected at the property, initiating performance of one or more water damage mitigation operations.

20 Claims, 4 Drawing Sheets

MONITORING SYSTEM FOR DETECTING LEAKS USING A SYSTEM OF FLOW RATE SENSORS AND SMART VALVES

CROSS-REFERENCE TO RELATED APPLICATION

This application claims the benefit of U.S. Provisional Application No. 62/579,718, filed Oct. 31, 2017, and titled "Monitoring System for Detecting Leaks Using a System of Flow Rate Sensors and Smart Valves," which is incorporated by reference.

BACKGROUND

One or more water dispensing appliances installed at a property may be configured to consume water. Typically, water consumed by the one or more water dispensing appliances installed at the property is routed to the property via a network of one or more pipes. A water dispensing appliance may include a washing machine, a dish washer, a toilet, a shower, an indoor faucet, an outdoor faucet, an irrigation system, or the like.

A water dispensing appliance, one or more pipes associated with the respective water dispensing appliance, or both, can be subject to leaking. A leaking water dispensing appliance, a leaking pipe, or both, can result in property damage, expensive utility bills, or both.

SUMMARY

According to one innovative aspect of the present disclosure, a property monitoring system for detecting water leaks and mitigating the damage caused by the detected leaks is disclosed. The property monitoring system may include one or more processors and one or more storage devices, the one or more storage devices storing instructions that, when executed by the one or more processors, cause the one or more processors to perform operations. The operations may include obtaining, by the property monitoring system, sensor data that is generated by one or more flow rate sensors located at a property, obtaining, by the property monitoring system, status data that is generated by one or more connected water shutoff valves located at the property, determining, by the property monitoring system and based on (i) the obtained sensor data and (ii) the obtained status data whether a water leak has been detected at the property, and in response to determining, by the property monitoring system and based on (i) the obtained sensor data and (ii) the obtained status data, that a water leak has been detected at the property, initiating, by the property monitoring system, performance of one or more water damage mitigation operations.

Other aspects include corresponding methods, apparatus, and computer programs to perform actions of methods defined by instructions encoded on computer storage devices.

These and other versions may optionally include one or more of the following features. For instance, in some implementations, the operations may further include obtaining, by the property monitoring system, second sensor data that is generated by the one or more flow rate sensors located at the property, obtaining, by the property monitoring system, second status data that is generated by the one or more connected water shutoff valves located at the property, and subsequent to determining, by the property monitoring system and based on (i) the obtained second sensor data and (ii) the obtained second status data, that a water leak has not been detected at the property, obtaining, by the property monitoring system, (i) third sensor data that is generated by the one or more flow rate sensors and (ii) third status data that is generated by the one or more connected water shutoff valves.

In some implementations, the sensor data may include data that represents a current flow rate of water through at least a portion of a water pipe that is located in the property.

In some implementations, the data that represents the current flow rate may be based on a scale of gallons-per-minute.

In some implementations, each connected water shutoff valve of the one or more connected water shutoff valves may include a network interface and one or more second processors, wherein the network interface is configured to receive one or more instructions across a network, wherein the one or more instructions, when processed by the one or more second processors of the connected water shutoff valve, cause the one or more second processors of the connected water shutoff valve to adjust a current operational state of the connected water shutoff valve.

In some implementations, the status data may include data that represents whether each of the one or more connected water shutoff valves is currently opened or closed.

In some implementations, a closed connected water shutoff valve is configured in an operational state that blocks a flow of water beyond a particular point in a pipe where the closed connected water shutoff valve is located.

In some implementations, an open connected water shutoff valve is configured in an operational state that allows water to flow beyond a particular point in a pipe where the open connected water shutoff valve is located.

In some implementations, determining, by the property monitoring system and based on (i) the obtained sensor data and (ii) the obtained status data, whether a water leak has been detected at the property may include determining, by the property monitoring system, that the obtained status data for one or more of the connected water shutoff valves indicates that one or more of the connected water shutoff valves is closed, determining, by the property monitoring system, an amount of pressure exerted on the one or more connected water shutoff valves that are closed, determining, by the property monitoring system, that the obtained sensor data indicates that water flow has been detected by one or more of the one or more flow rate sensors, and determining, by the property monitoring system and based on (i) the amount of pressure exerted on the one or more connected water shutoff valves that are closed and (ii) the obtained sensor data indicating that water flow has been detected by the one or more flow rate sensors, that a leak has been detected at the property.

In some implementations, determining, by the property monitoring system, an amount of pressure exerted on the one or more connected water shutoff valves that are closed may include obtaining, by the property monitoring system, second sensor data that is generated by one or more pressure sensors that are located within a vicinity of the one or more connected water shutoff valves that are closed and determining, by the property monitoring system and based on the second sensor data, an amount of pressure exerted on the one or more connected water shutoff valves that are closed.

In some implementations, the one or more water damage mitigation operations may include (i) transmitting a notification to a user device indicating that a leak has been detected at the property or (ii) transmitting one or more instructions to a connected water shutoff valve that is within a vicinity a detected water leak.

In accordance with another innovative aspect of the present disclosure, a method for detecting water leaks is disclosed. The method may include actions of obtaining, by the property monitoring system, first sensor data that is generated by one or more flow rate sensors located at a property, obtaining, by the property monitoring system, first status data that is generated by one or more connected water shutoff valves located at the property, determining, by the property monitoring system and based on (i) the obtained first sensor data and (ii) the obtained first status data, whether a water leak has been detected at the property, and subsequent to determining, by the property monitoring system and based on (i) the obtained first sensor data and (ii) the obtained first status data, that a water leak has not been detected at the property, obtaining, by the property monitoring system, (i) second sensor data that is generated by the one or more flow rate sensors and (ii) second status data that is generated by the one or more connected water shutoff valves.

Other aspects include corresponding systems, apparatus, and computer programs to perform actions of methods defined by instructions encoded on computer storage devices.

These and other versions may optionally include one or more of the following features. For instance, in some implementations, the method may further include obtaining, by the property monitoring system, third sensor data that is generated by the one or more flow rate sensors located at the property, obtaining, by the property monitoring system, third status data that is generated by the one or more connected water shutoff valves located at the property, and in response to determining, by the property monitoring system and based on (i) the obtained third sensor data and (ii) the obtained third status data, that a water leak has been detected at the property, initiating, by the property monitoring system, performance of one or more water damage mitigation operations.

DETAILED DESCRIPTION

Figure 1:
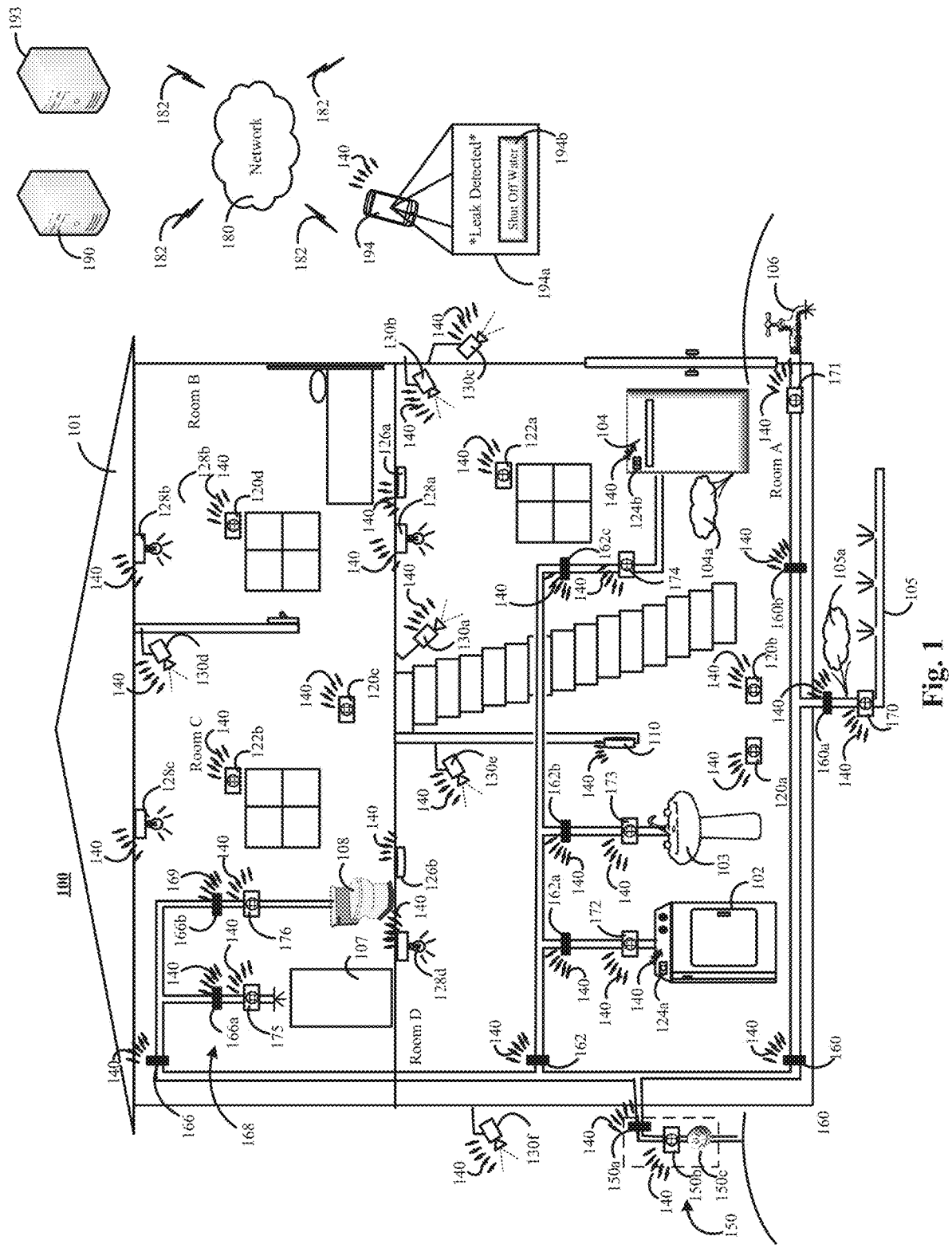
FIG. 1 is a contextual diagram of an example of a monitoring system that uses flow rate sensors and connected valves to detect leaks.

FIG. 1 is a contextual diagram of an example of a monitoring system 100 that uses flow rate sensors 170, 171, 172, 173, 174, 175, 176 and connected valves 160, 160a, 160b, 162, 162a, 162b, 162c, 166, 166a, 166b to detect leaks 104a, 107a.

The monitoring system 100 includes a monitoring system control unit 110, a connected water meter 150, one or more connected valves 160, 160a, 160b, 162, 162a, 162b, 162c, 166, 166a, 166b, one or more water dispensing appliances 102, 103, 104, 105, 106, 107, 108, one or more flow rate sensors 170, 171, 172, 173, 174, 175, 176, and a local network 140. In addition, the monitoring system 100 may also include one or more motions sensors 120a, 120b, 120c, one or more glass break sensors 122a, 122b, one or more energy sensors 124a, 124b, one or more smoke sensors 126a, 126b, one or more connected lights 128a, 128b, 128c, 128d, one or more cameras 130a, 130b, 130c, 130d, 130e, 130f, a remote network 180, a user device 194, a monitoring application server 190, a central alarm station serer 193, or a combination thereof.

The monitoring system control unit 110 is configured to monitor sensor data generated and broadcast by one or more sensors installed at the property 101. Monitoring generated sensor data may include analyzing the broadcasted sensor data to determine whether the broadcasted sensor data is indicative of an event. An event may include an emergency event, an alarm event, a leak event, or the like. For example, the monitoring system control unit 110 may detect sensor data generated by a smoke sensor 126a, 128b and determine based on the sensor data generated by the smoke sensor 126a, 126b that smoke is presence in the property 101, and then trigger an emergency event based on the presence of smoke at the property 101. Triggering an emergency event may include sending one or more notifications to the monitoring application server 190, the central alarm station server 193, or both, using one or more of the networks 140, 180 and one or more communication links 182. In response to the emergency event, the a component of monitoring system 100 such as the central alarm station server 193 may dispatch firefighters to the property 101, dispatch police to the property 101, dispatch ambulances to the property 101, or both.

By way of another example, a legitimate occupant of the property 101 can configure the monitoring system 100 to be in an "armed away" state. The "armed away" state can arm one or more motion sensors 120a, 120b, 120c in the property 101 so that they generate and broadcast sensor data in response to the detection of movement at the property 101 when no legitimate occupants of the property 101 are present. In the "armed away" state, one or more other types of sensors may also be armed such as one or more contact sensors, one or more glass break sensors, or the like.

Based on detection of movement of an object in the property 101 when the monitoring system 100 is in the "armed away" state, one or more motion sensors 120a, 120b, 120c may generate and broadcast sensor data that is indicative of one or more objects moving inside the property 101. The monitoring system control unit 110 may detect the sensor data broadcasted by the one or more motion sensors 120a, 120b, 120c, and then trigger an alarm event based on the presence of moving objects at the property 101 if the system is also in the "armed away" state. Triggering an alarm event may include sending one or more notifications to the monitoring application server 190, the central alarm station server 193, or both, using one or more of the networks 140, 180 and one or more communication links 182. In response to the alarm event, a component of monitoring system 100 such as the central alarm station server 193 may dispatch police officers the property 101.

By way of another example, the monitoring system 100 can also detect leak events. The monitoring unit such as a monitoring system control unit 110 may detect sensor data generated by one or more flow rate sensors 170, 171, 172, 173, 174, 175, 176, status data from one or more connected valves 160, 160a, 160b, 162, 162a, 162b, 162c, 166, 166a, 166b, or both, and determine based on the detected sensor data, status data, or both, whether a leak is occurring at a property 101. In response to the determination that there is a leak at the property 101, the monitoring system control unit 110 can transmit an instruction to one or more connected valves 160, 160a, 160b, 162, 162a, 162b, 162c, 166, 166a, 166b (or the connected water meter 150) that instruct the one or more connected valves 160, 160a, 160b, 162, 162a, 162b, 162c, 166, 166a, 166b (or connected water meter 150) to turn off water to one or more water dispensing appliances such as washing machine 102, a sink 103, a dishwasher 104, an irrigation system 105, an external spigot 106, a shower 107, a toilet 108 or the like.

Alternatively, or in addition, the monitoring system control unit 110 can transmit a notification to a user device 194 via the local network 140, the remote network 180, or both, that is designed to alert the user of a user device 194 that there is a leak at the property 101. In some implementations, the notification may also instruct the user device 194 to render a graphical user interface 194a that includes one or more options for shutting off water to the property 101. For example, the graphical user interface 194a may include a graphical icon 194b that, when selected, can close a connected valve 160, 160a, 160b, 162, 162a, 162b, 162c, 166, 166a, 166b (or connected shutoff valve 150c of the connected water meter 150). The particular connected valve (or connected shutoff valve 150c) that is associated with the graphical icon 194b may be based on an analysis of data detected by the monitoring system control unit 110 such as sensor data from one or more flow rate sensors 170, 171, 172, 173, 174, 175, 176, status data from one or more connected valves 160, 160a, 160b, 162, 162a, 162b, 162c, 166, 166a, 166b, or both.

The connected water meter 150 may include at least a water meter 150a, a flow sensor 150b, and a connected shutoff valve 150c. The water meter 150a may measure water usage of the property 101 in terms of a unit of volume such as liters, gallons, or the like. Data from the water meter 150a can be used by a utility company to determine a monthly water consumption total. The flow rate sensor 150b may include one or more sensors that can detect water consumption at the property 101 and generate sensor data describing the detected water consumption. The generated sensor data may represent characteristics of a property's 101 water consumption rate at a particular time. In some implementations, the generated sensor data may be indicative of amount of water used in gallons. Alternatively, or in addition, the characteristics may include a waveform indicating the shape of a water consumption curve, an amplitude of the underlying water flow rate (e.g., an amplitude of the water consummation curve), a value representing the water flow rate (e.g., gallons per minute), or the like.

The flow rate sensor 150b is configured to detect water consumption data of different flow magnitudes ranging from low flow water usage as small as, for example, 0.01 gallons per min to high flow leaks as great as, for example, 25 gallons per minute. This range of magnitudes also includes the capability of the sensor 150b to detect water consumption data describing one or more water flow rates that falls on the spectrum between 0.01 gallons per min, or less, and 25 gallons per minute, or more.

The connected water meter 150 may also include a connected shut-off valve 150c. The connected shut-off valve 150c is configured to receive messages across one or more networks such as a local network 140, a remote network 180, or both, from one or more components of the monitoring system 100 such as the monitoring system control unit 110, monitoring application server 190, a central alarm station server 193, a user device 194, or a combination thereof. For example, the monitoring system control unit 110, the monitoring application server 190, the central alarm station server 193, a user device 194, or a combination thereof, may transmit a message to the connected shut-off valve 150c that instructs the connected shut-off valve 150c to close and cut-off the water supply to all water dispensing appliances 102, 103, 104, 105, 106, 107, 108 installed at the property 101. Alternatively, the monitoring system control unit 110, the monitoring application server 190, the central alarm station server 193, the user device 110, or a combination thereof may transmit a message to the connected shut-off valve 150c that instructs the connected shut-off valve 150c to open and allow water dispensing appliances installed at the property 101 to access the water supply.

The monitoring system 100 includes one or more connected valves 160, 160a, 160b, 162, 162a, 162b, 162c, 166, 166a, 166b. The connected valves 160, 160a, 160b, 162, 162a, 162b, 162c, 166, 166a, 166b may be installed partially, or fully, inside water pipes of the property 101. Each connected valve 160, 160a, 160b, 162, 162a, 162b, 162c, 166, 166a, 166b is configured to receive messages across one or more networks such as the local network 140, the remote network 180, or both, that can instruct the connected valve to close or open. If an open connected valve 160, 160a, 160b, 162, 162a, 162b, 162c, 166, 166a, 166b installed in (or on) a first pipe is instructed to close, the connected valve 160, 160a, 160b, 162, 162a, 162b, 162c, 166, 166a, 166b can stop flow of water to any water dispensing appliance that (i) the first pipe provides water to and (ii) is positioned after the closed connected valve. If a closed connected valve 160, 160a, 160b, 162, 162a, 162b, 162c, 166, 166a, 166b installed in a second pipe is instructed to open, then water flow can resume to any water dispensing appliance that (i) the second pipe provides water to and (ii) is positioned after the opened connected valve.

The connected valves 160, 160a, 160b, 162, 162a, 162b, 162c, 166, 166a, 166b can allow for more granular control of water in the event that a leak is detected. In some implementations, for example, a connected valve 160, 160a, 160b, 162, 162a, 162b, 162c, 166, 166a, 166b at each pipe branching point in the property 101. Accordingly, the monitoring system 100 can dynamically configure the state (e.g., on state (open valve) or off state (closed valve) of each connected valve in the property 101 to allow for water consumption by one or more water dispensing devices while simultaneously cutting off a water supply to one or more other water dispensing appliances that may be leaking. The connected valves 160, 160a, 160b, 162, 162a, 162b, 162c, 166, 166a, 166b may be used in addition to the connected water meter 150. Alternatively, the connected valves 160, 160a, 160b, 162, 162a, 162b, 162c, 166, 166a, 166b may be used instead of the connected water meter 150. For example, a property 101 may use a conventional water meter (e.g., without a connected shut off valve) and a plurality of connected valves 160, 160a, 160b, 162, 162a, 162b, 162c, 166, 166a, 166b.

In some implementations, the connected valves 160, 160a, 160b, 162, 162a, 162b, 162c, 166, 166a, 166b may be designed to receive and execute instructions to open or close the connected valve in order to facilitate, or prohibit, the flow of water within a pipe. In other implementations, the connected valves 160, 160a, 160b, 162, 162a, 162b, 162c, 166, 166a, 166b may include a flow rate sensor that enables the each connected valve 160, 160a, 160b, 162, 162a, 162b, 162c, 166, 166a, 166b to determine the flow rate of water in the portion of the particular portion of the pipe where the connected valve is installed.

The monitoring system 100 may also include a plurality of flow rate sensors 170, 171, 172, 173, 174, 175, 176. The flow rate sensors 170, 171, 172, 173, 174, 175, 176 are each configured to detect water consumption data of different flow magnitudes ranging from low flow water usage as small as, for example, 0.01 gallons per min to high flow leaks as great as, for example, 25 gallons per minute. This range of magnitudes also includes the capability of the flow rate sensors 170, 171, 172, 173, 174, 175, 176 to detect water consumption data describing one or more water flow rates that falls on the spectrum between 0.01 gallons per min, or less, and 25 gallons per minute, or more. One or more of the plurality of flow rate sensors 170, 171, 172, 173, 174, 175, 176 may be installed at, or in the vicinity of, an external connection point for a water pipe. The external connection point for a water pipe may include, for example, the location where the water pipe connects to a water dispensing appliance.

In some implementations, each particular flow rate sensor 170, 171, 172, 173, 174, 175, 176 installed near an external connection point may be configured based on water consumption by the water dispensing device that is connected to the external connection point where the particular flow rate sensor is installed. For example, the flow rate sensor may include a memory device that is used to store an expected flow rate (e.g., gallons per minute) of the water dispensing device that is associated with the external connection point where the flow rate sensor is installed. Alternatively, the expected flow rate (e.g., gallons per minute) of the water dispensing device that is associated with the external connection point where the flow rate sensor is installed may be maintained by the monitoring system control unit 110, the monitoring application server 192, the central alarm station server 193, or the like. For example, the monitoring system control unit 110, the monitoring application server, the central alarm station serve 193, or other monitoring system component, may analyze historical flow rate data values that represent flow rates through the external connection point. In such instances, the monitoring system control unit 110, the monitoring application server 110, the central alarm station server 193, or other monitoring system component, may determine an expected flow rate for the external connection point based on the historical flow rate data values. In some implementations, the expected flow rate data stored in the memory device may the expected flow rate determined by the monitoring system based on historical data. In other implementations, the expected flow rate data stored in the memory device may be a predetermined number based on factory specifications of the water dispensing device.

The monitoring system control unit 110 (or the monitoring application server 190) may store a map of the locations of each connected valve 160, 160a, 160b, 162, 162a, 162b, 162c, 166, 166a, 166b and each flowrate sensor 170, 171, 172, 173, 174, 175, 176. In addition, the map may include, for example, a table that associates a flowrate sensor identifier with each of the one or more connected valves that can be used to shut off the water to. In such instances, the monitoring system control unit 110 (or the monitoring application server 190) can determine, based on a flow rate sensor identifier, the one or more connected valves, the state of the one or more connected valves, or both, that can be used to shut off water to the water dispensing appliance. In some implementations, the monitoring system control unit 110 (or the monitoring application server 190) may select the least amount of connected valves that need to be closed in order to shut off water to a particular water dispensing appliance. In other implementations, the monitoring system control unit 110 (or monitoring application server) may select the connected valve that shuts off water to multiple different water dispensing appliances connected to a common branch of pipes. In other implementations, the monitoring system control unit 110 (or monitoring application server 190) may select the connected shut-off valve 105a of the connected water meter 150 to shut off all water to the property 101. The particular set of connected valves selected by the monitoring system 100 may be based on a variety of factors such as the magnitude of a leak (e.g., gallons per minute), predetermined user settings in a user profile, or the like.

The monitoring system 100 can analyze sensor data generated and broadcast by the flow rate sensors 170, 171, 172, 173, 174, 175, 176 to determine if there is a leak at the property 101. For example, a component of the monitoring system 100 such as the monitoring system control unit 110, the monitoring application server 190, the central alarm station server 193, can determine whether a leak is occurring at the property 101 by comparing the current flow rate detected by a flow rate sensor 170, 171, 172, 173, 174, 175, 176 to the expected flow rate for the water dispensing appliance that is associated with the external connection point where the flow rate sensor is installed. If the current flow rate is more than a predetermined threshold amount more (or less) than the expected flow rate, then a component of the monitoring system such as the monitoring system control unit 110, the monitoring application server 190, the central alarm station server 193, or a combination thereof may determine that the flow rate is abnormal. The monitoring system 100 may analyze different characteristics of the flow of water in determining if there is a leak other than the flow rate. For example, the flow rate sensor 170, 171, 172, 173, 174, 175, 176 can capture and the monitoring system 100 analyze sensor data generated by the flow rate sensors indicative of water flow frequency, water flow duration, or the like. In response to determining that the water usage is abnormal, the monitoring system 100 may initiate performance of one or more water damage mitigation operations. For example, the monitoring system control unit 110 may instruct one or more connected valves to close, the monitoring system control unit 110 may notify a user device to alert the user of the existence of a potential leak, or a combination thereof.

A network interface of a receiving monitoring system component such as a connected valve, a user device, or the like may receive the instructions, and a processing unit of the connected valve, user device, or the like may process the one or more instructions received from the monitoring system control unit 110 (or monitoring application server 190) to cause the receiving monitoring system component to perform functionality that results in the achievement of the mitigation of water damages. For example, a connected value may close responsive to receipt and processing of one or more instructions from the monitoring system control unit 110 (or monitoring application server 190) and stop water from flowing through a pipe to a subsequent portion of pipe or a water dispensing appliance where the leak may be occurring. By way of another example, a user may generate an alert notification, based on the receipt and processing of one or more instructions from the monitoring system control unit 110 (or monitoring application server 190), that alerts a user that a leak may be occurring at a property. The alert notification may include a potential leak location based on the one or more connected valves identified as being capable of stopping a leak. The alert notification can mitigate damage caused by the leak because the alert notification an cause a human user to take one or more actions to stop the leak such as submitting an instruction through an application or web portal accessible via the user device that that is configured to initiate closing one or more connected valves, thereby stopping the leak. A user could also navigate to and toggle one or more manual water shutoff valves responsive to receipt of the alert notification. By way of yet another example, a user could contact a plumber to fix a slow leak in response to the alert notification, thereby mitigating further damages caused by the water leak.

The monitoring system 100 can also use other leak detection methods. For example, the monitoring system 100 can detect leaks at the property 101 based on the pressure exerted on a closed connected valve 160, 160a, 160b, 162, 162a, 162b, 162c, 166, 166a, 166b in a plumbing system, herein referred to as back pressure. In some implementations, the back pressure exerted on a closed connected valve may be calculated based on (i) status data obtained from one or more connected valves indicating whether a connected valve 160, 160a, 160b, 162, 162a, 162b, 162c, 166, 166a, 166b is open (or closed) and (ii) sensor data (or lack thereof) generated by one or more flow rate sensors 170, 171, 172, 173, 174, 175, 176 installed at (or in a vicinity of) external connection points indicating whether the flow of water is detected at (or in a vicinity of) the external connection point. Alternatively, in some implementations, the back pressure may be calculated using one or more pressure sensors. In some implementations, the back pressure on a particular connected valve may be measured based on readings from multiple different pressure sensors in one or more pipes.

In some implementations, the back pressure on one or more connected valves 160, 160a, 160b, 162, 162a, 162b, 162c, 166, 166a, 166b can be compared to the flow rate at (or in the vicinity of) the connected valves 160, 160a, 160b, 162, 162a, 162b, 162c, 166, 166a, 166b. The flow rate at (or near) a connected valve 160, 160a, 160b, 162, 162a, 162b, 162c, 166, 166a, 166b may be measured by a flow rate sensor 170, 171, 172, 173, 174, 175, 176 that is positioned after a corresponding connected valve 160, 160a, 160b, 162, 162a, 162b, 162c, 166, 166a, 166b in series. Alternatively, in some implementations, the flow rate at (or integrated with) the connected valve 160, 160a, 160b, 162, 162a, 162b, 162c, 166, 166a, 166b may be measured by one or more sensors at (or integrated with) a particular connected valve 160, 160a, 160b, 162, 162a, 162b, 162c, 166, 166a, 166b.

By way of example, anytime a connected valve 160, 160a, 160b, 162, 162a, 162b, 162c, 166, 166a, 166b is opened, the back pressure across the entire system of connected valves can be measured at any point in the system of connected valves. The back pressure across the entire system can be calculated based on (i) status data obtained from one or more connected valves indicating which connected valves 160, 160a, 160b, 162, 162a, 162b, 162c, 166, 166a, 166b are open and (ii) sensor data (or lack thereof) generated by one or more flow rate sensors 170, 171, 172, 173, 174, 175, 176 installed at (or in a vicinity of) external connection points indicating whether the flow of water is detected at (or in a vicinity of) the external connection point. If flow rate sensors 170, 171, 172, 173, 174, 175, 176 at external points are not activated (e.g., not detecting any water flow), but back pressure has dropped and a connected valve 160, 160a, 160b, 162, 162a, 162b, 162c, 166, 166a, 166b at a branching point associated with the flow rate sensor 170, 171, 172, 173, 174, 175, 176 is detecting measurable water flow, then it is likely that there is a leak somewhere in the system of pipes of a property 101. A component of the monitoring system 100 such as the monitoring system control unit 110, the monitoring application server 190, central alarm station server 193, or the like, can (i) detect this scenario based on an analysis of the sensor data from each of the one or more flow rate sensors 170, 171, 172, 173, 174, 175, 176, status data from one or more connected valves 160, 160a, 160b, 162, 162a, 162b, 162c, 166, 166a, 166b, and sensor data from one or more connected valves 160, 160a, 160b, 162, 162a, 162b, 162c, 166, 166a, 166b and (ii) instruct the connected shut-off valve 150a to close or instruct a connected valve 160, 160a, 160b, 162, 162a, 162b, 162c, 166, 166a, 166b at one or more branching points to close.

Each of the aforementioned leak detection methods will be discussed in more detail with reference to FIG. 1.

For example, with reference to FIG. 1, the monitoring system 100 is capable of detecting a leaking water dispensing appliance such as a leaking dish washer 104.

In response to the detection of a potential leak, the monitoring system 100 may be configured to initiate performance of one or more water damage mitigation operations. For example, a component of a monitoring system 100 such as a monitoring system control unit 110, a monitoring application server 190, a central alarm station 193, or the like to identify the connected valve 162c that is closest in proximity to the flow rate sensor 174 that detected the likely leak 104a and transmit instructions to the connected valve 162c that instruct the connected valve 162c to close. This will cut off the water supply to the dish washer 104, stop the leak 104a, and allow the remaining water dispensing appliances 102, 103, 105, 107, 108 to continue using water. Alternatively, or in addition, the component of the monitoring system 100 (or a different component of the monitoring system 100) that detected the leak may transmit a notification to a user device 194 to alert a legitimate occupant of the property 101 of the likely existence of a potential leak 104a. In some implementations, the notification may ask the legitimate occupant of the property 101 whether connected valve 162c should be closed. In such instances, the notification may provide, for display on the user interface of the user device 194 (or output via a speaker of the user device 194) data such as the current flow rate detected by sensor 174, the expected flow rate of the dish washer 104, and the like. The legitimate occupant of the property 101 may provide input to the user device 194 that instructs the monitoring system 100 to (i) close the connected valve 162c associated with the potential leak or (ii) ignore the potential leak.

In a second scenario, the dish washer 104 is powered on and using water to wash dishes. The flow rate sensor 174 that is installed at, or in the vicinity of, the external connection point of a pipe to the dish washer 104 can detect the current flow rate of water to the dish washer 104 and provide data describing the current flow rate of water through the pipe towards the dish washer 104 to the water analytics unit. The water analytics unit can obtain the expected flow rate for the sensor 174 and compare the current flow rate of water passing through the pipe to the dish washer 104 to the expected rate of water for the sensor 174. The water analytics unit can determine that the flow rate of the water passing through the pipe to the dish washer is more than a threshold amount greater than the amount of water typically used by a dish washer 104 to wash dishes. As a result, the water meter analytics unit may infer the likely existence of a dishwasher 104 leak 104a. In such instances, a component of the monitoring system 100 such as a monitoring system control unit 110, a monitoring application server 190, or a central alarm station server 193 can identify the connected valve 162c that is closest in proximity to the flow rate sensor 174 and instruct the connected valve 162c to close. Alternatively, or in addition, the monitoring system control unit 110, the monitoring application server 190, central alarm station server 193 notify a legitimate occupant of the property 101 of the likely existence of a leak.

The monitoring system 100 can detect leaks in other ways. For example, the monitoring system 100 can detect leaks by analyzing the back pressure of the system of pipes.

With reference to FIG. 1, an irrigation system 105 may be experiencing a significant leak 160a caused by a burst in a pipe that occurred after the connected valve 160a and before the flow rate sensor 170. In this scenario, a component of the monitoring system 100 such as the monitoring system control unit 110, the monitoring application server 190, or central alarm monitoring station 193 may calculate the back pressure on connected valves 160, 160a, 160b, 162, 162a, 162b, 162c, 166, 166a, 166b across the entire system of pipes of property 101. The back pressure may be calculated based on status data broadcast by one or more connected valves 160, 160a, 160b, 162, 162a, 162b, 162c, 166, 166a, 166b indicating what valves are opened and sensor data generated by one or more flow rate sensors 170, 171, 172, 173, 174, 175, 176. The monitoring system control unit 110, the monitoring application server 190, or central alarm station 193 may continue to monitor the back pressure on the connected valves 160, 160a, 160b, 162, 162a, 162b, 162c, 166, 166a, 166b of the system of pipes of the property 101. The monitoring system control unit 110, the monitoring application server 190, or central alarm station 193 of the monitoring system 100 may detect a drop in the back pressure and a measurable flow rate at (or near) connected valve 160a. Within the same period of time as the drop in back pressure and measureable flow rate at the connected valve 160a, the monitoring system control unit 110, the monitoring application server 190, or central alarm station 193 may also determine that the flow rate sensor 170 is not detecting any measurable water flow. In such instances, the monitoring system control unit 110, monitoring application server 190, or central alarm station server 193 may determine that a leak 105a is likely occurring.

The monitoring system control unit 110, the monitoring application server 190, or the central alarm station server 193 may initiate performance of one or more water damage mitigation operations based on the detection of the likely existence of the leak 105a. The monitoring system control unit 110 can instruct the connected valve 160 to close the entire branch of pipes associated with the leak 105a, instruct the connected valve 160a to close the leg of the pipes feeding the irrigation system 105 with water, or the like. Alternatively, or in addition, monitoring system control unit 110, the monitoring application server 190, or the central alarm station server 193 can notify the legitimate occupant of the property 101 of the likely existence of a leak at the property 101.

The monitoring system 100 facilitates other applications separate and apart from leak detection. For example, the monitoring system 100 can be used to winterize water pipes.

For example, a component of the monitoring system 100 such as the monitoring system control unit 110, the monitoring application server 190, or both, may monitor the weather associated with a geographic location where the property 101 is located. In response to a determination that freezing weather is in the forecast for the geographic location where the property 101 resides, the monitoring system control unit 110 (or monitoring application server 190) may transmit an instruction to a connected valve 160 to close so that water is cut off from the pipe branch that provides water to an external spigot 106. In some implementations where in the property 101 has connected spigots installed, the monitoring system control unit 110 (or monitoring application server 190) may transmit an instruction to the external spigot 106 to open. Alternatively, the monitoring system control unit 110 (or monitoring application server 190) may transmit a notification to a user device 194 that prompts a legitimate occupant of the property 101 to open the external spigot 106 after the connected valve 160 is closed. The closing of the connected valve 160 and opening of the spigot 106 allows for the external pipes to fully relieve themselves of water. Since the pipes will be empty, there will not be water inside the pipes to freeze, contract, and cause the pipes to burst.

In some implementations, after transmitting an instruction to close the connected valves 160 the monitoring system control unit 110 (or monitoring application server 190) may transmit a notification to a user device 194 to alert the user that the irrigation system is ready for winterization. In such instances, this alert can help remind a legitimate occupant of a property 101 that the irrigation system needs to have maintenance performed on it before the irrigation lines freeze with water in them.

Figure 2:
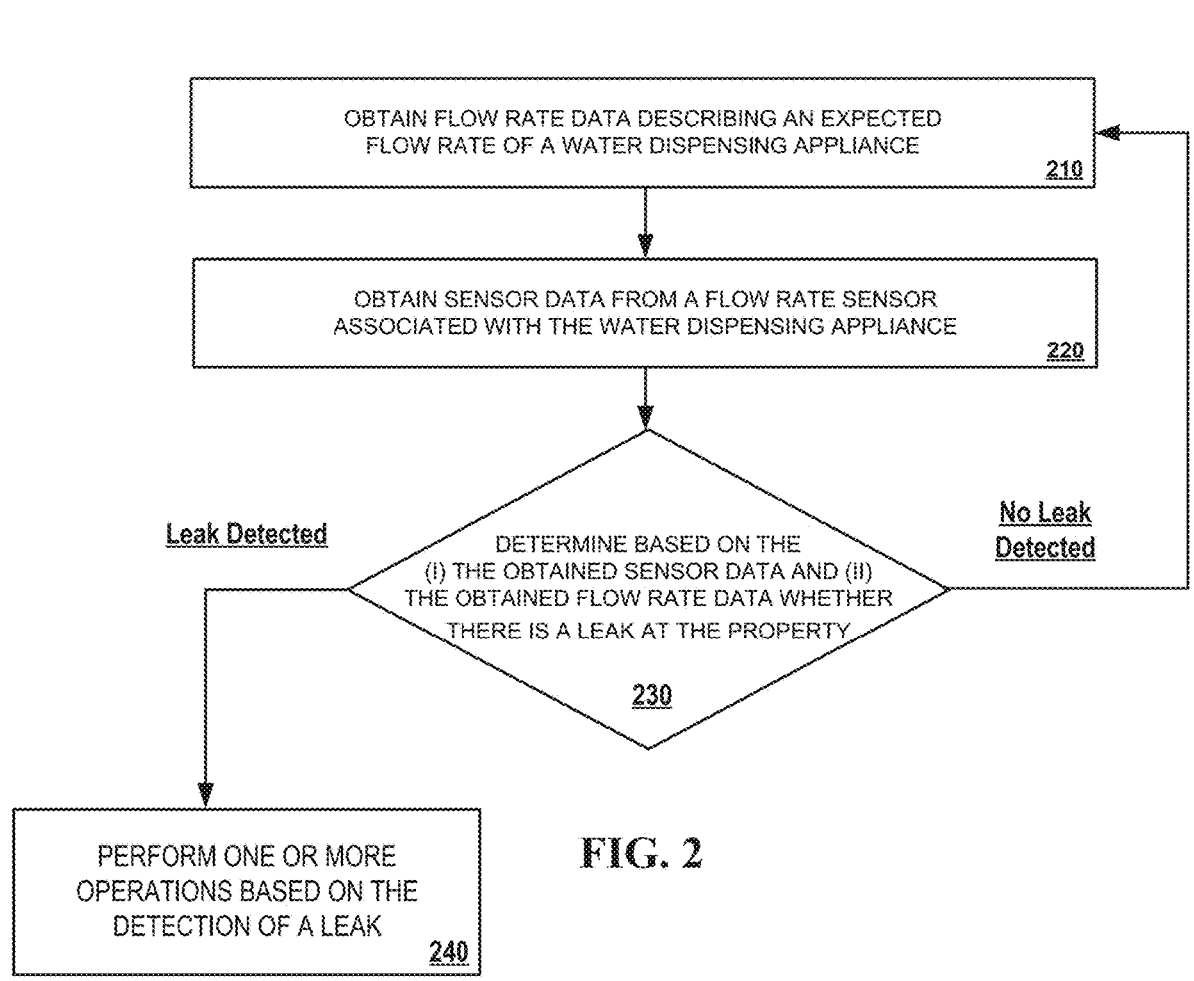
FIG. 2 is a flowchart of an example of a process for detecting leaks using flow rate sensors and connected valves.

FIG. 2 is a flowchart of an example of a process 200 for detecting leaks using flow rate sensors and connected valves. Generally, the process 200 may include obtaining flow rate data describing an expected flow rate of a water dispensing appliance (210), obtaining sensor data from a flow rate sensor associated with the water dispensing appliance (220), and determining, based on the (i) obtained sensor data and (ii) the obtained flow rate data, whether there is a leak at the property (230). In response to determining that there is not a leak at the property, then the process 200 continues to stage 210. Alternatively, in response to determining that there is a leak at the property, the process 200 continues to stage 210 to initiate performance of one or more water damage mitigation operations based on the detection of a leak (240). For convenience, the process 200 will be described below as being performed by a monitoring unit such as a monitoring system control unit 110 or a monitoring application server 190 of FIG. 1.

A monitoring unit can begin performance of the process 200 by obtaining 210 flow rate data describing an expected flow rate of a water dispensing appliance. For example, the monitoring unit can obtain data indicating that the water dispensing device receives water through a connection point in a water pipe using a flow rate measured in gallons-per-minute.

The monitoring unit can obtain 220 sensor data from a flow rate sensor associated with the water dispensing appliance. For example, the monitoring unit can obtain sensor data that is indicative of the current flow rate (e.g., gallons-per-minute) of water through a water pipe to the water dispensing appliance.

The monitoring unit can determine 230, based on the (i) obtained sensor data and (ii) the obtained flow rate data, whether there is a leak at the property. For example, the monitoring unit can determine if the current flow rate is a predetermined threshold amount more (or less) than the expected flow rate. If the current flow rate is determined to be a threshold amount more (or less) than the expected flow rate, then the monitoring unit can determine that there is a leak at the property that the flow rate is abnormal In response to determining that there is not a leak at the property, the monitoring unit can continue to monitor water flow through pipes at the property by obtaining 210 sensor data from one or more flow rate sensors installed at the property.

Alternatively, in response to determining that there is a leak at the property, the monitoring unit can initiate performance 240 of one or more water damage mitigation operations based on the detection of a leak. For example, the monitoring unit may instruct one or more connected valves to close, the monitoring unit may notify a user device to alert the user of the existence of a potential leak, or a combination thereof.

Figure 3:
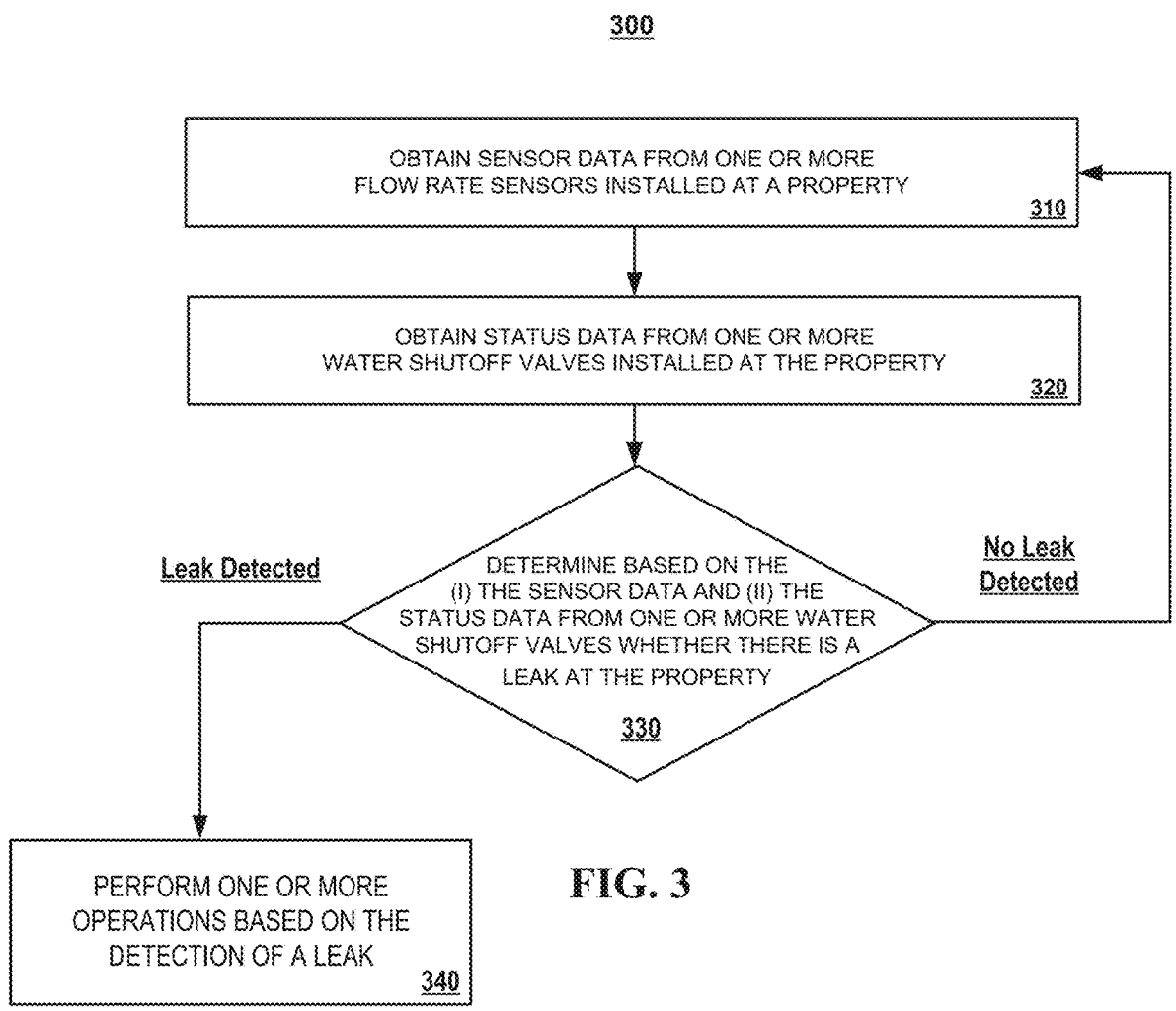
FIG. 3 is a flowchart of an example of another process for detecting leaks using flow rate sensors and connected valves.

FIG. 3 is a flowchart of an example of another process 300 for detecting leaks using flow rate sensors and connected valves. Generally, the process 300 includes obtaining sensor data from one or more flow rate sensors installed at a property (310), obtaining status data from one or more water shutoff valves installed at the property (320), and determining, based on the sensor data and (ii) the status data from one or more water shutoff valves whether there is a leak at the property (330). In response to determining that there is not a leak at the property, then the process 300 continues to stage 310. Alternatively, in response to determining that there is a leak at the property, the process 300 continues to stage 310 to initiate performance one or more water damage mitigation operations based on the detection of a leak (340). For convenience, the process 300 will be described below as being performed by a monitoring unit such as a monitoring system control unit 110 or a monitoring application server 190 of FIG. 1.

The monitoring unit may begin performance of the process 300 by obtaining 310 sensor data from one or more flow rate sensors installed at a property. For example, the monitoring unit can obtain sensor data indicative of the flow rate of water (or lack thereof).

The monitoring unit can obtain 320 status data from one or more water shutoff valves installed at the property. For example, the monitoring unit can obtain data indicating the state (e.g., open or closed) of the one or more shutoff valves.

The monitoring unit can determine 330, based on (i) the sensor data and (ii) the status data from one or more water shutoff valves whether there is a leak at the property. For example, the monitoring unit may determine whether there is a leak at the property based, in part, on the changes on the back pressure on one or more connected valves. For example, if the obtained sensor data indicates that the flow rate sensors at external points are not activated (e.g., not detecting any water flow), but back pressure has dropped and a connected valve at a branching point associated with the flow rate sensor is detecting measurable water flow, then the monitoring unit can determine that it is likely that there is a leak somewhere in the system of pipes of a property.

In response to determining that there is not a leak at the property, the monitoring unit can continue to monitor water flow through pipes at the property by obtaining 310 sensor data from one or more flow rate sensors installed at the property.

Figure 4:
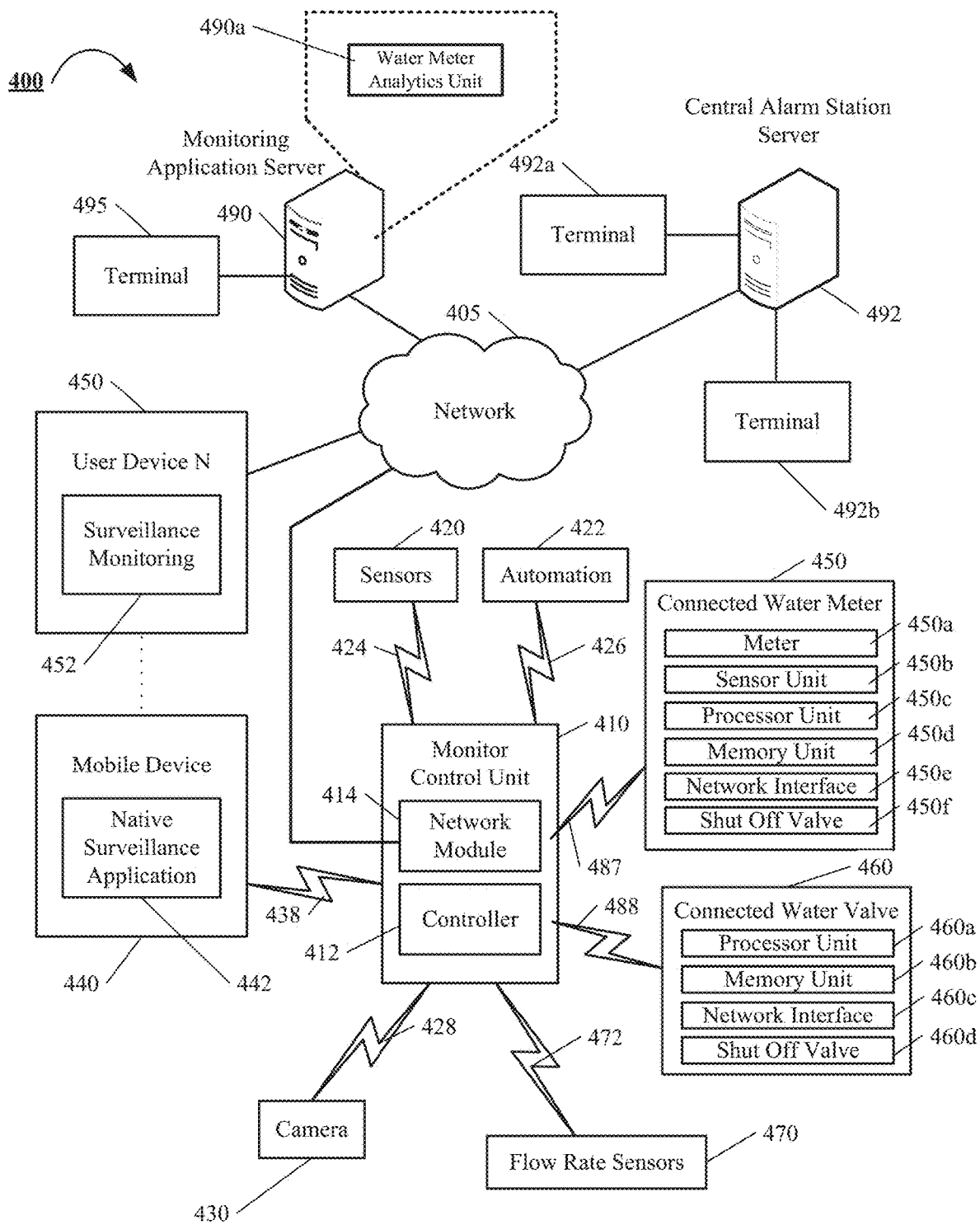
FIG. 4 is a block diagram of components that can be used in a monitoring system that uses flow rate sensors and connected valves to detect leaks.

Alternatively, in response to determining that there is a leak at the property, the monitoring unit can initiate performance 340 of one or more water damage mitigation operations based on the detection of a leak. For example, the monitoring unit may instruct one or more connected valves to close, the monitoring unit may notify a user device to alert the user of the existence of a potential leak, or a combination thereof FIG. 4 is a block diagram of components that can be used in a monitoring system that uses flow rate sensors and connected valves to detect leaks.

The electronic system 400 includes a network 405, a monitoring system control unit 410, one or more user devices 440, 450, a monitoring application server 490, and a central alarm station server 492. In some examples, the network 405 facilitates communications between the monitoring system control unit 410, the one or more user devices 440, 450, the monitoring application server 490, and the central alarm station server 492.

The network 405 is configured to enable exchange of electronic communications between devices connected to the network 405. For example, the network 405 may be configured to enable exchange of electronic communications between the monitoring system control unit 410, the one or more user devices 440, 450, the monitoring application server 490, and the central alarm station server 492. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410 includes a controller 412 and a network module 414. The controller 412 is configured to control a monitoring system (e.g., a home alarm or security system) that includes the monitoring system control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module 414 included in the monitoring system control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the monitoring system control unit 410 to communicate over a local area network and/or the Internet. The network module 414 also may be a voiceband modem configured to enable the alarm panel to communicate over the telephone lines of Plain Old Telephone Systems (POTS).

The monitoring system that includes the monitoring system control unit 410 includes one or more sensors or detectors. For example, the monitoring system may include multiple sensors 420. The sensors 420 may include a contact sensor, a motion sensor, a glass break sensor, or any other type of sensor included in an alarm system or security system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag.

The monitoring system control unit 410 communicates with the module 422 and the camera 430 to perform surveillance or monitoring. The module 422 is connected to one or more devices that enable home automation control. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the monitoring system control unit 210. For instance, the module 222 may cause a lighting system to illuminate an area to provide a better image of the area when captured by a camera 230.

The camera 430 may be a video/photographic camera or other type of optical sensing device configured to capture images. For instance, the camera 430 may be configured to capture images of an area within a building monitored by the monitoring system control unit 410. The camera 430 may be configured to capture single, static images of the area and also video images of the area in which multiple images of the area are captured at a relatively high frequency (e.g., thirty images per second). The camera 430 may be controlled based on commands received from the monitoring system control unit 410.

The camera 430 may be triggered by several different types of techniques. For instance, a Passive Infra Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the monitoring system control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 490 over the Internet. In these implementations, image data captured by the camera 430 does not pass through the monitoring system control unit 410 and the camera 430 receives commands related to operation from the monitoring application server 490.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the monitoring system control unit 410 and can control the environmental (e.g., temperature) settings based on commands received from the monitoring system control unit 410.

In some implementations, the thermostat 434 is a dynamically programmable thermostat and can be integrated with the monitoring system control unit 410. For example, the dynamically programmable thermostat 434 can include the monitoring system control unit 410, e.g., as an internal component to the dynamically programmable thermostat 434. In addition, the monitoring system control unit 410 can be a gateway device that communicates with the dynamically programmable thermostat 434.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 further includes a connected water meter 450. The connected water meter may include water meter 450a, a sensor unit 450b, a processor unit 450c, a memory unit 450d, a network interface 450e and a connected shut-off valve 450f. The water meter 450a may measure water usage of a property where the connected water meter 450 is installed. The water meter 450a may measure water in terms of a unit of volume such as liters, gallons, or the like. The measurements of the water meter 450a may be used by a utility company to determine a monthly water consumption total. The sensor unit 450b may include one or more sensors configured to detect water flow and generate sensor data. The sensor data generated by the sensors unit 482 may be used to generate data representing water usage by one or more water dispensing devices. The generated data may describe water consumption by a water dispensing device. The generated data may include a water consumption curve, an amplitude of the underlying water flow rate, or the like.

The connected water meter 450 may use the network interface 450e, one or more communication links 487, the network module 414, the network 405, a combination thereof, or the like to transmit the sensor data to the monitoring application server 490. In such instances, the monitoring application server 490 may then use a water meter analytics unit 490a. Alternatively, the monitoring application server 490 can forward the sensor data generated by the sensor unit 482 to the water meter analytics unit 490a for analysis without generating a periodic consumption report. In some implementations, the monitoring water meter analytics unit 490a may be hosted by the monitoring system control unit 410.

The processing unit 483 may include one or more processors. The processing unit 483 may access, and process, instructions stored in the memory unit 484 to realize the functionality of the connected water meter 450 described by this specification.

The connected shut-off valve 486 may be configured to close, or open, the shut-off valve in response instructions from one or more remote computers such as the monitoring application server 490, the user device 440, the user device 450, the central alarm station server, or the like. The connected shut-off valve 486 may be configured to have its own network interface that is configured to receive instructions to close, or open, the shut-off valve. Alternatively, the connected water meter 450 may include a single network interface 185 that can received instructions from one or more remote computers, and forward the instructions to the connected shut-off valve 486.

The system 400 also include a plurality of connected water valves 460. The connected water valve 460 includes a processing unit 460a, a memory unit 460b, a network interface 460c, and a shut off valve 460d. In some implementations, the connected water valve 460 may also include a flow rate sensing unit. The connected water valves 460 may be installed partially, or fully, inside water pipes of the property. Each connected water valve 460 is configured to receive messages across one or more networks such as the network 405 and the communication link 488 that instruct the connected valve to close or open. If an open connected valve 460 installed in (or on) a first pipe is instructed to close, the connected valve 460 can stop flow of water to any water dispensing appliance that (i) the first pipe provides water to and (ii) is positioned after the closed connected valve. If a closed connected water valve 460 is installed in a second pipe is instructed to open, then water flow can resume to any water dispensing appliance that (i) the second pipe provides water to and (ii) is positioned after the opened connected valve.

The connected water valves 460 can allow for more granular control of water in the event that a leak is detected. In some implementations, for example, a connected water valve 460 at each pipe branching point in the property 101. Accordingly, the monitoring system can dynamically configure the state (e.g., on state (open valve) or off state (closed valve) of each connected valve in the property to allow for water consumption by one or more water dispensing devices while simultaneously cutting off a water supply to one or more other water dispensing appliances that may be leaking. The connected water valves 460 may be used in addition to the connected water meter 450. Alternatively, the connected water valves 460 may be used instead of the connected water meter 450. For example, a property may use a conventional water meter (e.g., without a connected shut off valve) and a plurality of connected valves 460.

The monitoring system 400 may also include a plurality of flow rate sensors 470. The flow rate sensors 470 are each configured to detect water consumption data of different flow magnitudes ranging from low flow water usage as small as, for example, 0.01 gallons per min to high flow leaks as great as, for example, 25 gallons per minute. This range of magnitudes also includes the capability of the flow rate sensors 470 to detect water consumption data describing one or more water flow rates that falls on the spectrum between 0.01 gallons per min, or less, and 25 gallons per minute, or more. One or more of the plurality of flow rate sensors 470 may be installed at, or in the vicinity of, an external connection point for a water pipe. The external connection point for a water pipe may include, for example, the location where the water pipe connects to a water dispensing appliance.

In some implementations, each particular flow rate sensor 470 installed near an external connection point may be configured based on water consumption by the water dispensing device that is connected to the external connection point where the particular flow rate sensor is installed. For example, the flow rate sensor may include a memory device that is used to store an expected flow rate (e.g., gallons per minute) of the water dispensing appliance that is associated with the external connection point where the flow rate sensor is installed. Alternatively, the expected flow rate (e.g., gallons per minute) of the water dispensing appliance that is associated with the external connection point where the flow rate sensor is installed may be maintained by the monitoring system control unit 410, the monitoring application server 492, the central alarm station server 493, or the like.

The flow rate sensors 470 can generate sensor data that describes the water flow rate detected by the sensor 470. The flow rate sensors 470 can broadcast the generated sensor data via the network 405 using communication links 472.

The water meter analytics unit 490a can be configured to perform the operations described with respect to FIGS. 1, 2, and 3. Thought the water meter analytics unit 490a is shown in FIG. 400 has being hosted by the monitoring application server 490, the water meter analytics unit 490a may be hosted by other components of the monitory system 400 such as the monitoring system control unit 410.

The sensors 420, the module 422, the camera 430, the thermostat 434, the connected water meter 450, the connected water valves 460, and the flow rate sensors 470 communicate with the controller 412 over communication links 424, 426, 428, 487, 488, 472. The communication links 424, 426, 428, 487, 488, 472 may be a wired or wireless data pathway configured to transmit signals from the sensors 420, the module 422, the camera 430, the thermostat 434, the connected water meter 450, the connected water valves 460, and the flow rate sensors 470 to the controller 412. The sensors 420, the module 422, the camera 430, the thermostat 434, the connected water meter 450, the connected water valves 460, and the flow rate sensors 470 may continuously transmit sensed values to the controller 412, periodically transmit sensed values to the controller 412, or transmit sensed values to the controller 412 in response to a change in a sensed value.

The communication links 424, 426, 428, 487, 488, 472 may include a local network. The sensors 420, the module 422, the camera 430, the thermostat 434, the connected water meter 450, the connected water valve 460, the flow rate sensors 470, and the controller 412 may exchange data and commands over the local network. The local network may include 402.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 4 (CAT5) or Category 4 (CAT6) wired Ethernet network. The local network may be a mesh network constructed based on the devices connected to the mesh network.

The monitoring application server 490 is an electronic device configured to provide monitoring services by exchanging electronic communications with the monitoring system control unit 410, the one or more user devices 440, 450, and the central alarm station server 492 over the network 405. For example, the monitoring application server 490 may be configured to monitor events (e.g., alarm events) generated by the monitoring system control unit 410. In this example, the monitoring application server 490 may exchange electronic communications with the network module 414 included in the monitoring system control unit 410 to receive information regarding events (e.g., alarm events) detected by the monitoring system control unit 410. The monitoring application server 490 also may receive information regarding events (e.g., alarm events) from the one or more user devices 440, 450.

In some examples, the monitoring application server 490 may route alarm data received from the network module 414 or the one or more user devices 440, 450 to the central alarm station server 492. For example, the monitoring application server 490 may transmit the alarm data to the central alarm station server 492 over the network 405.

The monitoring application server 490 may store sensor and image data received from the monitoring system and perform analysis of sensor and image data received from the monitoring system. Based on the analysis, the monitoring application server 490 may communicate with and control aspects of the monitoring system control unit 410, the connected water meter 450, the one or more user devices 440, 450, or a combination thereof.

The monitoring application server 490 may include a water meter analytics unit 490a. The water meter analytics unit 490a may analyze water consumption data such sensor data generated by the sensor unit 482 in order to detect leaks as described above with respect to FIGS. 1-8. Alternatively, or in addition, the water meter analytics unit 490a may be configured to analyze water consumption data such as sensor data, periodic consumption reports, or the like in order to identify the one or more types of water dispensing appliances that dispensed water during the time period associated with the sensor data generated by the sensor unit 482, the time period associated with a period consumption report, or the like. The analysis performed by the water meter analytics unit 490a may include an isolated events analysis, an overlapping events analysis, or the like.

The central alarm station server 492 is an electronic device configured to provide alarm monitoring service by exchanging communications with the monitoring system control unit 410, the connected water meter 450, the one or more mobile devices 440, 450, and the monitoring application server 490 over the network 405. For example, the central alarm station server 492 may be configured to monitor alarm events generated by the monitoring system control unit 410. In this example, the central alarm station server 492 may exchange communications with the network module 414 included in the monitoring system control unit 410 to receive information regarding alarm events detected by the monitoring system control unit 410. The central alarm station server 492 also may receive information regarding alarm events from the one or more mobile devices 440, 450, the connected water meter 450, and/or the monitoring application server 490.

The central alarm station server 492 is connected to multiple terminals 492a and 492b. The terminals 492a and 492b may be used by operators to process alarm events. For example, the central alarm station server 492 may route alarm data to the terminals 492a and 492b to enable an operator to process the alarm data. The terminals 492a and 492b may include general-purpose computers (e.g., desktop personal computers, workstations, or laptop computers) that are configured to receive alarm data from a server in the central alarm station server 492 and render a display of information based on the alarm data. For instance, the controller 412 may control the network module 414 to transmit, to the central alarm station server 492, alarm data indicating that a sensor 420 detected a door opening when the monitoring system was armed. The central alarm station server 492 may receive the alarm data and route the alarm data to the terminal 492a for processing by an operator associated with the terminal 492a. The terminal 492a may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 492a and 492b may be mobile devices or devices designed for a specific function. Although FIG. 4 illustrates two terminals for brevity, actual implementations may include more (and, perhaps, many more) terminals.

The one or more user devices 440, 450 are devices that host and display user interfaces. For instance, the user device 440 is a mobile device that hosts one or more native applications (e.g., the native surveillance application 442).

The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a native surveillance application 442. The native surveillance application 442 refers to a software/firmware program running on the corresponding mobile device that enables the user interface and features described throughout. The user device 440 may load or install the native surveillance application 442 based on data received over a network or data received from local media. The native surveillance application 442 runs on mobile devices platforms, such as iPhone, iPod touch, Blackberry, Google Android, Windows Mobile, etc. The native surveillance application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 490 and/or the monitoring system control unit 410 over the network 405. The user device 450 may be configured to display a surveillance monitoring user interface 452 that is generated by the user device 450 or generated by the monitoring application server 490. For example, the user device 450 may be configured to display a user interface (e.g., a web page) provided by the monitoring application server 490 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440, 450 communicate with and receive monitoring system data from the monitoring system control unit 410 using the communication link 438. For instance, the one or more user devices 440, 450 may communicate with the monitoring system control unit 410 using various local wireless protocols such as Wi-Fi, Bluetooth, Zwave, ZigBee, HomePlug (ethernet over powerline), or wired protocols such as Ethernet and USB, to connect the one or more user devices 440, 450 to local security and automation equipment. The one or more user devices 440, 450 may connect locally to the monitoring system and its sensors and other devices. The local connection may improve the speed of status and control communications because communicating through the network 405 with a remote server (e.g., the monitoring application server 490) may be significantly slower.

Although the one or more user devices 440, 450 are shown as communicating with the monitoring system control unit 410, the one or more user devices 440, 450 may communicate directly with the sensors and other devices controlled by the monitoring system control unit 410. In some implementations, the one or more user devices 440, 450 replace the monitoring system control unit 410 and perform the functions of the monitoring system control unit 410 for local monitoring and long range/offsite communication.

In other implementations, the one or more user devices 440, 450 receive monitoring system data captured by the monitoring system control unit 410 through the network 405. The one or more user devices 440, 450 may receive the data from the monitoring system control unit 410 through the network 405 or the monitoring application server 490 may relay data received from the monitoring system control unit 410 to the one or more user devices 440, 450 through the network 405. In this regard, the monitoring application server 490 may facilitate communication between the one or more user devices 440, 450 and the monitoring system.

In some implementations, the one or more user devices 440, 450 may be configured to switch whether the one or more user devices 440, 450 communicate with the monitoring system control unit 410 directly (e.g., through link 438) or through the monitoring application server 490 (e.g., through network 405) based on a location of the one or more user devices 440, 450. For instance, when the one or more user devices 440, 450 are located close to the monitoring system control unit 410 and in range to communicate directly with the monitoring system control unit 410, the one or more user devices 440, 450 use direct communication. When the one or more user devices 440, 450 are located far from the monitoring system control unit 410 and not in range to communicate directly with the monitoring system control unit 210, the one or more user devices 440, 450 use communication through the monitoring application server 490.

Although the one or more user devices 440, 450 are shown as being connected to the network 405, in some implementations, the one or more user devices 440, 450 are not connected to the network 405. In these implementations, the one or more user devices 440, 450 communicate directly with one or more of the monitoring system components and no network (e.g., Internet) connection or reliance on remote servers is needed.

In other implementations, the system 400 further includes network 405 and the sensors 420, the module 422, the camera 430, the thermostat 434, the connected water meter 450, the connected water valves 460, and the flow rate sensors 470, are configured to communicate sensor, image data, or both to the one or more user devices 440, 450 over network 405 (e.g., the Internet, cellular network, etc.). In yet another implementation, the sensors 420, the module 422, the camera 430, the thermostat 434, the connected water meter 450 (or a component, such as a bridge/router), the connected water valves 460, and the flow rate sensors 470 are intelligent enough to change the communication pathway from a direct local pathway when the one or more user devices 440, 450 are in close physical proximity to the sensors 420, the module 422, the camera 430, the thermostat 434, the connected water meter 450, the connected water valve 460, and the flow rate sensors 470 to a pathway over network 405 when the one or more user devices 440, 450 are farther from the sensors 420, the module 422, the camera 430, the thermostat 434, and the connected water meter 450. In some examples, the system leverages GPS information from the one or more user devices 440, 450 to determine whether the one or more user devices 440, 450 are close enough to the sensors 420, the module 422, the camera 430, the thermostat 434, the connected water meter 450, the connected water valves 460, and the flow rate sensors 470 to use the direct local pathway or whether the one or more user devices 440, 450 are far enough from the sensors 420, the module 422, the camera 430, the thermostat 434, the connected water meter 450, the connected water valves 460, and the flow rate sensors 470 that the pathway over network 405 is required. In other examples, the system leverages status communications (e.g., pinging) between the one or more user devices 440, 450 and the sensors 420, the module 422, the camera 430, the thermostat 434, the connected water meter 450, the connected water valve 460, and the flow rate sensors 470 to determine whether communication using the direct local pathway is possible. If communication using the direct local pathway is possible, the one or more user devices 440, 450 communicate with the sensors 420, the module 422, the camera 430, the thermostat 434, the connected water meter 450, the connected water valve 460, and one or more flow rate sensors 470 using the direct local pathway. If communication using the direct local pathway is not possible, the one or more user devices 440, 450 communicate with the sensors 420, the module 422, the camera 430, the thermostat 434, the connected water meter 450, the connected water valve 460, and the flow rate sensors 470 using the pathway over network 405.

The invention claimed is:

1. A property monitoring system for detecting water leaks from a water piping system at a property, the property monitoring system comprising:
   a plurality of connected water shutoff valves, wherein each connected water shutoff valve is configured to (i) adjust an operational state to control a flow rate of water through a respective pipe branch of the water piping system and to (ii) generate valve status data indicating the operational state of the connected water shutoff valve;
   a plurality of flow rate sensors, wherein each flow rate sensor is configured to generate flow rate sensor data indicating a flow rate of water through a respective pipe branch of the water piping system;
   one or more processors; and
   one or more storage devices, the one or more storage devices storing instructions that, when executed by the one or more processors, cause the one or more processors to perform operations comprising:
      obtaining, by the property monitoring system, flow rate sensor data that is generated by one or more of the plurality of flow rate sensors;
      obtaining, by the property monitoring system, valve status data that is generated by one or more of the plurality of connected water shutoff valves;
      identifying, by the property monitoring system and based on (i) the obtained flow rate sensor data and (ii) the obtained valve status data, a pipe branch of the water piping system in which a water leak is occurring; and
      in response to identifying the pipe branch of the water piping system in which the water leak is occurring, transmitting, by the property monitoring system, an instruction that causes one or more of the plurality of connected water shutoff valves to adjust operational state to control the flow rate of water through the identified pipe branch.

2. The property monitoring system of claim 1, wherein the operations further comprise:
   obtaining, by the property monitoring system, second flow rate sensor data that is generated by one or more of the plurality of flow rate sensors located at the property;
   obtaining, by the property monitoring system, second valve status data that is generated by one or more of the plurality of connected water shutoff valves located at the property; and
   subsequent to determining, by the property monitoring system and based on (i) the obtained second flow rate sensor data and (ii) the obtained second valve status data, that a water leak is not occurring at the property, obtaining, by the property monitoring system, (i) third flow rate sensor data that is generated by the one or more of the plurality of flow rate sensors and (ii) third valve status data that is generated by the one or more of the plurality of connected water shutoff valves.

3. The property monitoring system of claim 1, wherein the flow rate sensor data generated by each flow rate sensor includes data that represents a current flow rate of water through the respective pipe branch that connects to a respective water dispensing appliance at the property.

4. The property monitoring system of claim 3, wherein the data that represents the current flow rate is based on a scale of gallons-per-minute.

5. The property monitoring system of claim 1, wherein each connected water shutoff valve of the plurality of connected water shutoff valves includes a network interface and one or more second processors, wherein the network interface is configured to receive the instruction across a network, wherein the instruction, when processed by the one or more second processors of the connected water shutoff valve, causes the one or more second processors of the connected water shutoff valve to adjust the operational state of the connected water shutoff valve.

6. The property monitoring system of claim 1, wherein the valve status data includes data that represents whether each of the one or more connected water shutoff valves is currently opened or closed.

7. The property monitoring system of claim 6, wherein:
   a closed connected water shutoff valve is configured in an operational state that blocks a flow of water beyond a particular point in a pipe where the closed connected water shutoff valve is located, and
   an open connected water shutoff valve is configured in an operational state that allows water to flow beyond a particular point in a pipe where the open connected water shutoff valve is located.

8. The property monitoring system of claim 1, wherein identifying, by the property monitoring system and based on (i) the obtained flow rate sensor data and (ii) the obtained valve status data, a pipe branch of the water piping system in which a water leak, is occurring comprises:
   determining, by the property monitoring system, that the obtained status data for one or more of the plurality of connected water shutoff valves indicates that one or more of the connected water shutoff valves is closed;
   determining, by the property monitoring system, an amount of pressure exerted on the one or more connected water shutoff valves that are closed;
   determining, by the property monitoring system, that the obtained sensor data generated by a particular flow rate sensor of the plurality of flow rate sensors indicates water flowing through a respective pipe branch; and
   determining, by the property monitoring system and based on (i) the amount of pressure exerted on the one or more connected water shutoff valves that are closed and (ii) the obtained sensor data indicating water flowing through the respective pipe branch, that a water leak is occurring in the respective pipe branch.

9. The property monitoring system of claim 8, wherein determining, by the property monitoring system, an amount of pressure exerted on the one or more connected water shutoff valves that are closed comprises:

obtaining, by the property monitoring system, second sensor data that is generated by one or more pressure sensors that are located within a vicinity of the one or more connected water shutoff valves that are closed; and determining, by the property monitoring system and based on the second sensor data, an amount of pressure exerted on the one or more connected water shutoff valves that are closed.

10. The property monitoring system of claim 1, wherein the instruction causes the one or more of the plurality of connected water shutoff valves to adjust from an open operational state to a closed operational state.

11. A method for detecting water leaks from a water piping system at a property, the method comprising:

obtaining, by a property monitoring system, flow rate sensor data that is generated by one or more of a plurality of flow rate sensors, wherein each flow rate sensor of the plurality of flow rate sensors is configured to generate flow rate sensor data indicating a flow rate of water through a respective pipe branch of the water piping system;

obtaining, by the property monitoring system, valve status data that is generated by one or more of a plurality of connected water shutoff valves, wherein each connected water shutoff valve of the plurality of connected water shutoff valves is configured to (i) adjust an operational state to control a flow rate of water through a respective pipe branch of the water piping system and to (ii) generate valve status data indicating the operational state of the connected water shutoff valve;

identifying, by the property monitoring system and based on (i) the obtained flow rate sensor data and (ii) the obtained valve status data, a pipe branch of the water piping system in which a water leak is occurring; and in response to identifying the pipe branch of the water piping system in which the water leak is occurring, transmitting, by the property monitoring system, an instruction that causes one or more of the plurality of connected water shutoff valves to adjust operational state to control the flow rate of water through the identified pipe branch.

12. The method of claim 11, wherein the flow rate sensor data generated by each flow rate sensor includes data that represents a current flow rate of water through a respective pipe branch that connects to a respective water dispensing appliance at the property.

13. The method of claim 11, wherein the valve status data includes data that represents whether each of the one or more connected water shutoff valves is currently opened or closed.

14. The method of claim 11, wherein identifying the pipe branch of the water piping system in which a water leak is occurring comprises:

determining that valve status data generated by a particular connected water shutoff valve indicates a closed operational state of the particular connected water shutoff valve, wherein the particular connected water shutoff valve is configured to adjust operational state to control a flow rate of water through a particular pipe branch;

determining that flow rate sensor data generated by a particular flow rate sensor indicates water flowing through the particular pipe branch; and based on determining that valve status data generated by the particular connected water shutoff valve indicates a closed operational state of the particular connected water shutoff valve and that flow rate sensor data generated by the particular flow rate sensor indicates water flowing through the particular pipe branch, identifying the particular pipe branch as the pipe branch of the water piping system in which the water leak is occurring.

15. The method of claim 11, wherein identifying the pipe branch of the water piping system in which a water leak is occurring comprises:

determining that valve status data generated by a particular connected water shutoff valve indicates an open operational state of the particular connected water shutoff valve, wherein the particular connected water shutoff valve is configured to adjust operational state to control a flow rate of water through a particular pipe branch;

determining that flow rate sensor data generated by a particular flow rate sensor indicates no water flowing through the particular pipe branch; and based on determining that valve status data generated by the particular connected water shutoff valve indicates an open operational state of the particular connected water shutoff valve and that flow rate sensor data generated by the particular flow rate sensor indicates no water flowing through the particular pipe branch, identifying the particular pipe branch as the pipe branch of the water piping system in which the water leak is occurring.

16. The method of claim 11, wherein the instruction causes the one or more of the plurality of connected water shutoff valves to adjust to a closed operational state to shut off water flow to a particular water dispensing appliance that is connected to the pipe branch in which the water leak is occurring.

17. The method of claim 16, comprising:

selecting, based on the identified pipe branch in which the water leak is occurring, and from the plurality of connected water shutoff valves, the one or more of the plurality of connected water shutoff valves to adjust to the closed operational state.

18. The method of claim 17, comprising:

determining, based on the flow rate sensor data, a magnitude of the water leak; and selecting, based on the magnitude of the water leak, and from the plurality of connected water shutoff valves, the one or more of the plurality of connected water shutoff valves to adjust to the closed operational state.

19. The method of claim 11, comprising:

storing, in a memory of each flow rate sensor of the plurality of flow rate sensors, an expected flow rate of water through the respective pipe branch;

determining that a current flow rate of water through the respective pipe branch differs from the stored expected flow rate by greater than a threshold amount; and based on determining that the current flow rate of water through the respective pipe branch differs from the stored expected flow rate by greater than the threshold amount, determining that a water leak is occurring in the respective pipe branch.

20. A non-transitory computer readable storage medium storing instructions executable by a data processing apparatus and upon such execution cause the data processing apparatus to perform operations for detecting water leaks from a water piping system at a property, the operations comprising:
- obtaining, by a property monitoring system, flow rate sensor data that is generated by one or more of a plurality of flow rate sensors, wherein each flow rate sensor of the plurality of flow rate sensors is configured to generate flow rate sensor data indicating a flow rate of water through a respective pipe branch of the water piping system;
- obtaining, by the property monitoring system, valve status data that is generated by one or more of a plurality of connected water shutoff valves, wherein each connected water shutoff valve of the plurality of connected water shutoff valves is configured to (i) adjust an operational state to control a flow rate of water through a respective pipe branch of the water piping system and to (ii) generate valve status data indicating the operational state of the connected water shutoff valve;
- identifying, by the property monitoring system and based on (i) the obtained flow rate sensor data and (ii) the obtained valve status data, a pipe branch of the water piping system in which a water leak is occurring; and
- in response to identifying the pipe branch of the water piping system in which the water leak is occurring, transmitting, by the property monitoring system, an instruction that causes one or more of the plurality of connected water shutoff valves to adjust operational state to control the flow rate of water through the identified pipe branch.

* * * * *